United States Patent
Kwan et al.

(10) Patent No.: US 8,208,462 B2
(45) Date of Patent: *Jun. 26, 2012

(54) LINE DRIVER FOR AN ADAPTIVE HYBRID CIRCUIT

(75) Inventors: Tom Kwan, Cupertino, CA (US); Sumant Ranganathan, Sunnyvale, CA (US)

(73) Assignee: Broadcom Corporation, Irvine, CA (US)

(*) Notice: Subject to any disclaimer, the term of this patent is extended or adjusted under 35 U.S.C. 154(b) by 432 days.

This patent is subject to a terminal disclaimer.

(21) Appl. No.: 12/497,337

(22) Filed: Jul. 2, 2009

(65) Prior Publication Data

US 2009/0268646 A1 Oct. 29, 2009

Related U.S. Application Data

(63) Continuation of application No. 11/002,430, filed on Dec. 3, 2004, now Pat. No. 7,573,839.

(60) Provisional application No. 60/585,584, filed on Jul. 7, 2004.

(51) Int. Cl.
*H04B 3/23* (2006.01)
*H04M 9/08* (2006.01)

(52) U.S. Cl. .......... 370/386; 326/30; 370/282; 370/289; 370/290; 370/401; 375/219; 375/222; 375/261; 379/3; 708/322

(58) Field of Classification Search .......... 326/30; 370/282, 286, 289, 290, 401; 375/219, 222, 375/261; 379/390.04, 392, 399.01, 402, 379/406.01, 3, 406.05, 406.08, 406.09; 455/570; 708/322

See application file for complete search history.

(56) References Cited

U.S. PATENT DOCUMENTS

| | | | |
|---|---|---|---|
| 4,610,010 A * | 9/1986 | Claessen et al. | 370/282 |
| 4,647,868 A | 3/1987 | Mueller | |
| 4,715,064 A * | 12/1987 | Claessen | 379/392 |
| 4,918,684 A | 4/1990 | Boschet et al. | |
| 5,180,998 A | 1/1993 | Willems | |
| 5,204,854 A | 4/1993 | Gregorian et al. | |
| 5,715,238 A | 2/1998 | Hall et al. | |
| 5,754,082 A | 5/1998 | Swanson | |
| 6,151,391 A | 11/2000 | Sherwood et al. | |
| 6,185,300 B1 * | 2/2001 | Romesburg | 379/406.09 |
| 6,219,418 B1 * | 4/2001 | Eriksson et al. | 379/406.08 |
| 6,255,993 B1 | 7/2001 | Greeff et al. | |
| 6,298,046 B1 * | 10/2001 | Thiele | 370/282 |
| 6,304,155 B1 | 10/2001 | Fries | |
| 6,507,654 B1 | 1/2003 | Handforth et al. | |
| 6,538,500 B2 | 3/2003 | Hayat-Dawoodi | |
| 6,622,030 B1 * | 9/2003 | Romesburg et al. | 455/570 |

(Continued)

*Primary Examiner* — Gerald Gauthier (74) *Attorney, Agent, or Firm* — Sterne, Kessler, Goldstein & Fox PLLC (57) ABSTRACT

A second output transmission signal ("$TX_2$") added to a line driver is a scaled version of the main output transmission signal ("$TX_1$"). $TX_2$ is scaled from $TX_1$ by a variable scale factor K. An adaptive hybrid circuit subtracts $TX_1$ and $TX_2$ from a line signal carrying both a line transmission signal and a line received signal ("RX"). A programmable impedance $Z_{tune}$ is coupled between the $TX_2$ output of the line driver and the RX output of the adaptive hybrid circuit. A transmission echo in the output RX signal is measured. K and $Z_{tune}$ are then adaptively tuned to minimize the transmission echo. The hybrid in this case becomes a 4-port network, one port specifically added to adaptively cancel the transmission echo in the RX output of the adaptive hybrid circuit. Alternatively, the hybrid may be a 3-port hybrid including variable impedances to cancel the line transmission signal.

20 Claims, 7 Drawing Sheets

U.S. PATENT DOCUMENTS

| | | | |
|---|---|---|---|
| 6,724,219 B1* | 4/2004 | Kim et al. | 326/30 |
| 6,738,358 B2* | 5/2004 | Bist et al. | 370/289 |
| 6,859,531 B1* | 2/2005 | Deisher | 379/406.05 |
| 6,873,703 B1 | 3/2005 | Enriquez | |
| 6,996,230 B1* | 2/2006 | Chu et al. | 379/406.08 |
| 7,010,025 B1* | 3/2006 | Helfenstein et al. | 375/219 |
| 7,020,277 B1 | 3/2006 | Lee et al. | |
| 7,027,589 B2 | 4/2006 | Shi et al. | |
| 7,113,491 B2* | 9/2006 | Graziano et al. | 370/286 |
| 7,155,006 B2* | 12/2006 | Casper et al. | 379/390.04 |
| 7,155,178 B2 | 12/2006 | Chang et al. | |
| 7,171,436 B2* | 1/2007 | Egelmeers et al. | 708/322 |
| 7,173,962 B2* | 2/2007 | Dowling | 375/222 |
| 7,187,719 B2* | 3/2007 | Zhang | 375/261 |
| 7,283,543 B1* | 10/2007 | Thompson | 370/401 |
| 7,339,997 B2 | 3/2008 | Blaha | |
| 7,346,012 B2* | 3/2008 | Stopler | 370/286 |
| 7,359,489 B2* | 4/2008 | Page et al. | 379/3 |
| 7,573,839 B2* | 8/2009 | Kwan et al. | 370/286 |
| 7,881,458 B2* | 2/2011 | Stiscia et al. | 379/402 |
| 2003/0123650 A1* | 7/2003 | Ouyang | 379/406.01 |
| 2003/0169875 A1 | 9/2003 | Lee et al. | |
| 2004/0022308 A1 | 2/2004 | Altekar et al. | |
| 2006/0023647 A1* | 2/2006 | Kwan et al. | 370/286 |
| 2009/0268646 A1* | 10/2009 | Kwan et al. | 370/286 |

\* cited by examiner

LINE DRIVER FOR AN ADAPTIVE HYBRID CIRCUIT

CROSS REFERENCE TO RELATED APPLICATIONS

This application is a continuation of U.S. patent application Ser. No. 11/002,430, filed Dec. 3, 2004, entitled "Line Driver for an Adaptive Hybrid Circuit," which claims the benefit of U.S. Provisional Application No. 60/585,584, filed on Jul. 7, 2004, entitled "Line Driver for an Adaptive Hybrid Circuit," both of which are incorporated by reference herein in their entireties.

BACKGROUND OF THE INVENTION

1. Field of the Invention

The present invention relates to amplification in a signal transmission line.

2. Related Art

A line driver is an amplifier that amplifies a transmission ("TX") signal and drives the TX signal along a signal line. The line is characterized by its impedance, $Z_{line}$. Typically, line drivers have to drive large amplitude signals into low ohmic loads and hence are high power amplifiers. Additionally, for voltage mode line drivers there is a back matching impedance $Z_t$, also known as the termination impedance. Termination impedance $Z_t$ must be matched to the line impedance $Z_{line}$ to have no reflections. For a 1:1 transformer, for example, the actual voltage at the output of the line driver is approximately twice as big as the transmission voltage driven on the line.

In full duplex transmission systems, the same pair of wires carries the TX and received ("RX") signals simultaneously. The signal that includes both the TX and RX signals is called the line signal. Because of the number of signals, duplex transmission systems need a 3-port (TX, RX, and Line) circuit that can separate the RX signal from the TX signal. This 3-port circuit is called a hybrid.

Many systems use a single set of hybrid elements which are chosen to best match the line impedance under most conditions. But, since the line impedance may change depending on various properties of the line, such as load or length of the line, etc., current hybrids do not sufficiently separate the RX signal from the TX signal. Instead, a residual TX signal called the TX echo often remains in the extracted RX signal. This can degrade the quality and signal-to-noise ratio of the RX signal.

One solution is to use multiple sets of hybrid elements that are switched depending on the characteristics of $Z_{line}$. This requires multiple inputs for the front end and multiple sets of hybrid components that result in extra cost. Multiple components also require switches that choose the best component set for a particular signal line. These switches typically degrade linearity since they are highly nonlinear.

Therefore, there is a need for an efficient system that achieves improved TX echo cancellation in the hybrid.

SUMMARY OF THE INVENTION

In one exemplary embodiment, a novel hybrid circuit incorporates a second output transmission ("$TX_2$") signal output from the line driver to form a four-port network. The second input is a scaled version of the primary output transmission ("$TX_1$") signal. The $TX_2$ signal is scaled from the $TX_1$ signal by a variable scale factor K. The $TX_1$ signal and the $TX_2$ signal are both input into an adaptive hybrid circuit via their respective input paths. In addition, this adaptive hybrid circuit receives the line signal which carries both a line transmission ("TX") signal and a line received ("RX") signal. In one preferred embodiment, a variable, programmable impedance $Z_{tune}$ is coupled between the $TX_2$ output of the line driver and the $TX_2$ input of the adaptive hybrid circuit. In another embodiment, $Z_{tune}$ is incorporated into the line driver. In yet another embodiment, normally fixed impedances within the adaptive hybrid circuit are substituted with programmable impedances.

In the embodiment using $Z_{tune}$, the adaptive hybrid circuit uses the $TX_1$ and $TX_2$ signals to cancel out the line TX signal carried in the line signal. The adaptive hybrid circuit then outputs the remaining signal as the RX signal. A TX echo signal remaining on the RX path is then measured. Scale factor K and programmable impedance $Z_{tune}$ are adaptively tuned to minimize the TX echo, which changes as the total impedance on the line in use changes. In this manner, the adaptive hybrid circuit becomes a 4-port network with one port specifically added to adaptively cancel the TX echo in the RX output of the hybrid.

In the embodiment using programmable impedances within the hybrid, the $TX_1$ signal is used to cancel out the line TX signal. A residual line TX signal is measured in the output RX signal, and the programmable impedances are changed to adaptively minimize the residual line TX signal. In this embodiment, the adaptive hybrid circuit is a 3-port network.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION OF THE INVENTION

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

Figure 1:
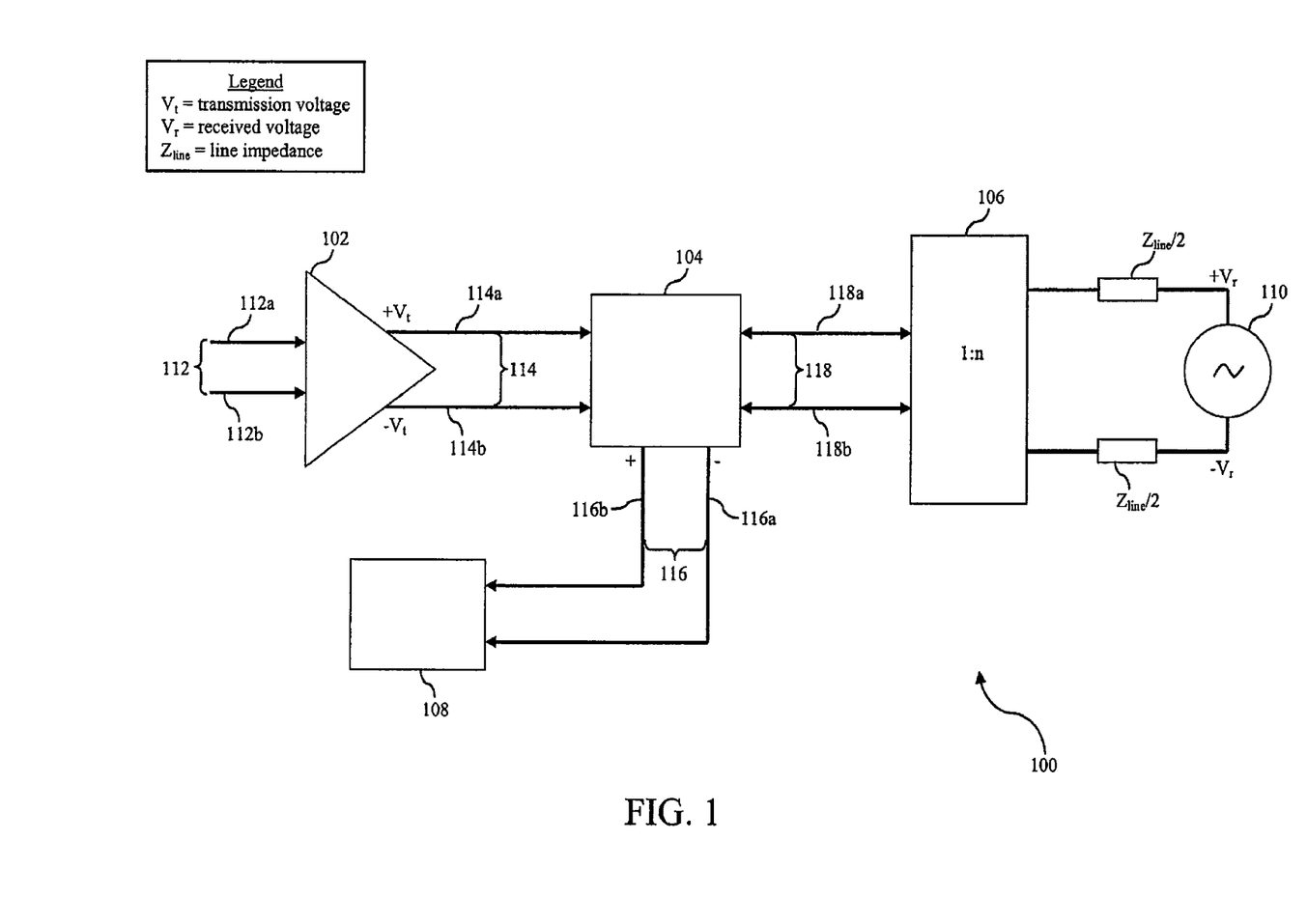
FIG. 1 is a block diagram of a non-adaptive duplex transmission system.

FIG. 1 is a block diagram of an example non-adaptive duplex transmission system 100. Transmission system 100 includes a line driver 102, a hybrid circuit 104, a transformer 106, and a receiver 108. Transformer 106 may be attached to a communications device such as, for example, a telephone line, modem, or wireless device. Transformer 106 is driven by source 110, which may be located upstream. For example and without limitation, source 110 may be located at a central office of the transmission system, or at the head-end of a cable system.

An input transmission signal is input into line driver 102 via input signal path 112. In the example shown, the input transmission signal has a positive component 112a and a negative component 112b. Line driver 102 amplifies the input transmission signal and outputs it as a TX signal along TX path 114 to hybrid 104. In this example, the TX signal has a positive component 114a and a negative component 114b. Line driver 102 drives at approximately twice the voltage $V_t$ needed for transmission. As shown in FIG. 1, line driver 102 outputs TX signal components 114a and 114b at $+V_t$ and $-V_t$ respectively.

Hybrid 104 receives the TX signal from TX path 114 and a line signal from transformer 106 via line signal path 118. The line signal includes at least a line RX signal and a line TX signal. One of skill in the art will recognize that the line RX signal and/or the line TX signal may be scaled by a factor from the original TX and RX signals, wherein the factor may be any number or fraction thereof, including 1. Hybrid 104 extracts an output RX signal from the line signal and outputs the output RX signal to receiver 108 along RX path 116. In this example, the output RX signal has a positive component 116a and a negative component 116b. If the cancellation of the line TX signal is not perfect, a residual TX signal will remain at the RX output of the hybrid after the output RX signal is extracted. This residual TX signal is called the TX echo. The TX echo may also result from over-cancellation by the TX signal input by the line driver.

Improper cancellation of the TX echo is caused by, among other things, changes in the line impedance $Z_{line}$. Line driver 102 drives $Z_{line}$ and has its own terminating impedance, $Z_t$ (see FIG. 2). Normally, $Z_{line}$ is not a fixed impedance but is a function of frequency and the actual line in use. The length of the line and other impairments like bridge taps significantly affect the characteristics of $Z_{line}$. For example, in a DSL system, different users are located at different distances from a central office. This results in different lines having different lengths. In addition, there may be some user ports that are not in use at a given time. This creates bridge taps in the system that affect $Z_{line}$.

Figure 2:
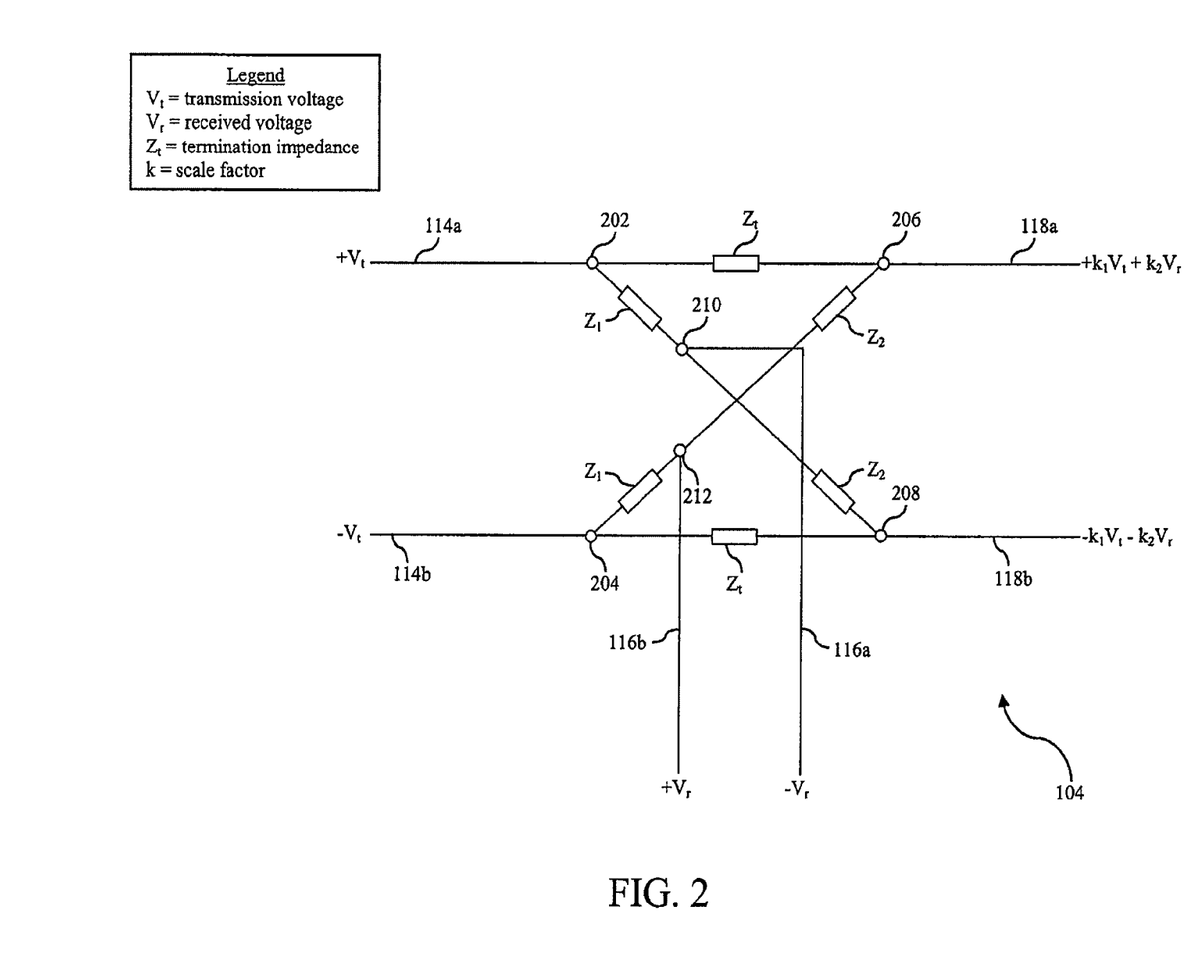
FIG. 2 is a block diagram of a hybrid for use in the duplex transmission system of FIG. 1.

FIG. 2 is a detailed block diagram of hybrid 104. TX signal components 114a and 114b, shown here at voltages $+V_t$ and $-V_t$ respectively, enter hybrid 104 at positive input node 202 and negative input node 204, respectively. Line signal components 118a and 118b enter hybrid 104 at positive line node 206 and negative line node 208, respectively. Because the line signal includes both the line TX signal (after it leaves hybrid 104) and the line RX signal, positive line signal component 118a has a voltage of $(k_1V_t+k_2V_r)$. $V_r$ is the voltage of the RX signal. Variables $k_1$ and $k_2$ are scale factors. As mentioned above, either or both of $k_1$ and $k_2$ may be equal to any number or fraction thereof, including 1. Variables $k_1$ and $k_2$ may also be complex in nature. In an embodiment, as will be explained further below, scale factors $k_1$ and $k_2$ automatically change in reaction to changing features of the line. Some of these changing features may be, for example, a change in line impedance or a change in frequency. Similarly, negative line signal component 118b has a voltage of $(-k_1V_t-k_2V_r)$.

Impedances $Z_1$ and $Z_2$ in hybrid 104 are chosen at a ratio such that all components of the line TX signal are cancelled at the intersection of the line signal path, the TX input path, and the RX path, shown here as positive RX output node 212 and negative RX output node 210. Impedances equal to $Z_1$, are located between the positive input node 202 and negative RX output node 210, as well as between negative input node 204 and positive RX output node 212. Impedances equal to $Z_2$ are located between positive line input node 206 and positive RX output node 212, as well as between negative line input node 208 and negative RX output node 210. If the values of $Z_1$ and $Z_2$ are chosen appropriately, RX signal 116 is equal to the received signal scaled by a constant. For a given n, where n is the transformer ratio element, $Z_1$ and $Z_2$ can be fixed to give reasonable hybrid echo cancellation over all the line conditions expected. However, there are several cases when the default cancellation is inadequate.

The residual TX echo in the RX signal output from hybrid 104 along RX path 116 with a 1:n transformer is given by:

$$V_{TX\_echo} = 2V_t * \left[ \frac{((Z_2 + (Z_t/2)) - k_1 * Z_1)}{Z_1 + Z_2 + (Z_t/2)} \right], \quad (1)$$

where $$k_1 = \frac{\frac{Z_{line}}{2n^2}\|(Z_1 + Z_2)}{Z_t + \left(\frac{Z_{line}}{2n^2}\|(Z_1 + Z_2)\right)}, \quad (2)$$

and $\|$ is a symbol for a parallel combination.

Ideally, the termination impedance of the hybrid must be matched to the line impedance. Here, for example, $Z_t$ would exactly equal $Z_{line}/2$ if n=1. As a further example, if $Z_{line}$ is exactly 100 ohms, the transformer is ideally a 1:2 transformer. If $Z_1$ and $Z_2$ are much larger than $Z_t$=50/n² (12.5 ohms in the present example), then the TX ratio at the RX output of the hybrid is given by:

$$V_{TX\_echo} = 2V_t * \left( \frac{(Z_2 - 0.5 * Z_1)}{Z_1 + Z_2} \right). \quad (3)$$

By choosing $Z_2$=0.5*$Z_1$, the residual TX echo signal can be made exactly zero. With this configuration, an RX path, such as RX path 116, needs the exact dynamic range of the expected RX signal and no more. If there were a large TX echo, then the RX path would need extra dynamic range equal to the difference between the TX echo signal and the RX signal to preserve the entire RX signal. However, since $Z_2$ and $Z_1$ are fixed, the echo cancellation in the hybrid suffers when $Z_{line}/2$ is not exactly equal to $Z_t$.

Figure 3:
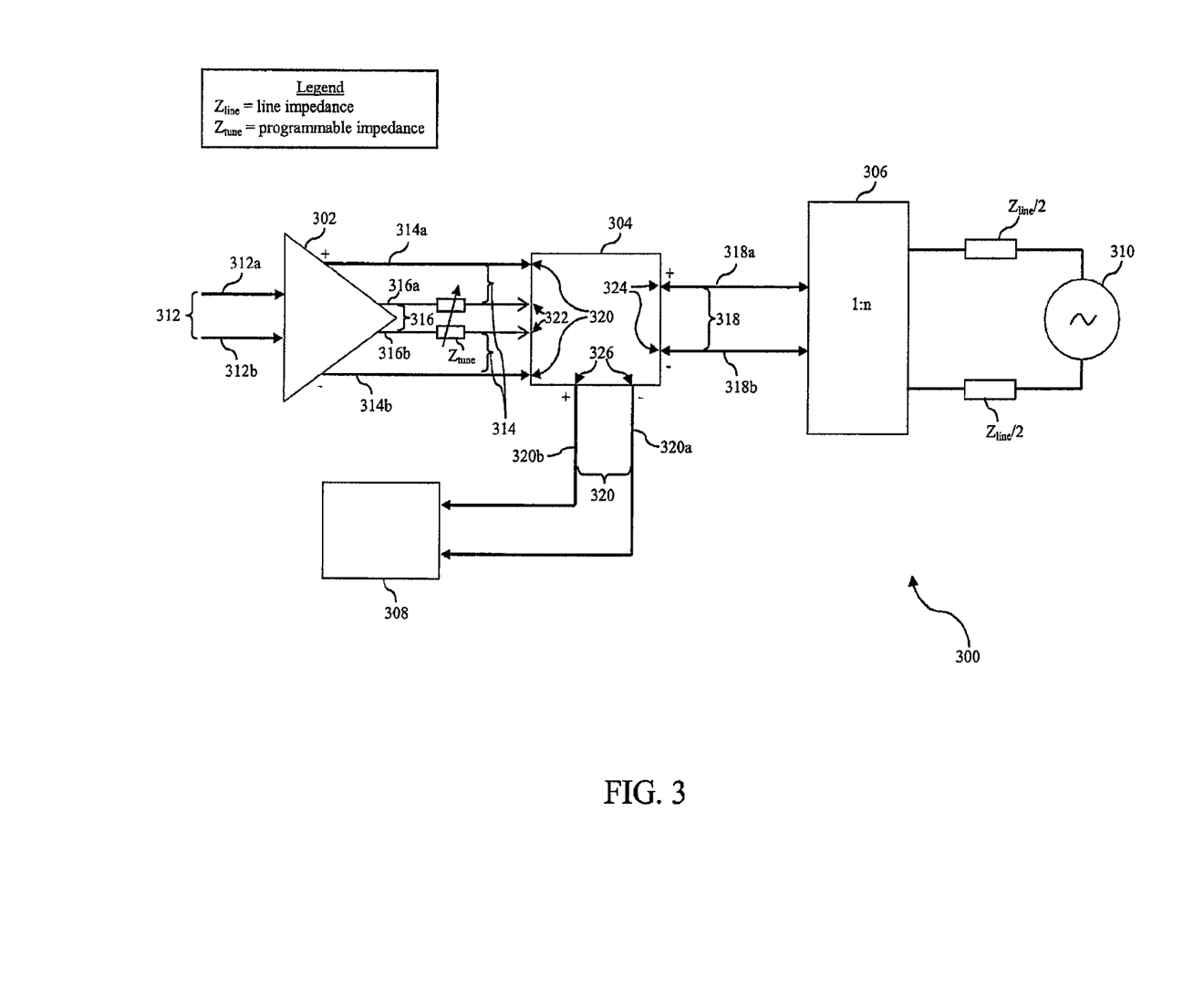
FIG. 3 is a block diagram of an adaptive duplex transmission system according to an embodiment of the present invention.

FIG. 3 is an illustration of an adaptive signal transmission system 300 according to an embodiment of the present invention. Transmission system 300 includes a line driver 302, an adaptive hybrid circuit 304, a transformer 306, and a receiver 308. As with transformer 106, transformer 306 may be attached to a communications device such as, for example, a telephone line, modem, or wireless device. Transformer 306 is driven by source 310, which may be located upstream.

An input transmission signal is input into line driver 302 via input signal path 312. In the example shown, the input transmission signal has a positive component 312a and a negative component 312b. Line driver 302 amplifies the input transmission signal and outputs it as a primary TX ("$TX_1$") signal along $TX_1$ path 314 to hybrid 304. In the example shown, the $TX_1$ signal has a positive component 314a and a negative component 314b. Again, using the case of a 1:1 transformer as an example, line driver 302 drives the $TX_1$ signal at approximately twice the voltage $V_t$ needed for transmission. Thus, the $TX_1$ signal is shown here as line driver output $+V_t$ and $-V_t$.

In addition to the $TX_1$ signal, line driver 302 outputs a secondary TX ("$TX_2$") signal along $TX_2$ path 316. In the example shown, the $TX_2$ signal has a positive component 316a and a negative component 316b. The $TX_2$ signal may be a version of the $TX_1$ signal scaled by a factor K. As will be described below, K may be programmable and may be varied as needed to tune transmission system 300. $TX_2$ path 316 also includes a variable, programmable impedance $Z_{tune}$. Although programmable impedance $Z_{tune}$ is shown here as located in $TX_2$ path 316, one of skill in the art will recognize that $Z_{tune}$ may also be implemented within line driver 302 or other locations in the circuit. As will be described below, $Z_{tune}$ may also be changed as needed to tune transmission system 300.

Adaptive hybrid circuit 304 receives the $TX_1$ signal from $TX_1$ path 314 through a $TX_1$ input port 320. Adaptive hybrid circuit 304 receives the $TX_2$ signal from $TX_2$ path 316 through a $TX_2$ input port 322. Adaptive hybrid circuit 304 also receives a line signal carried between adaptive hybrid circuit 304 and transformer 306 via line signal path 318 through a line input port 324. In the example shown, the line signal has a positive component 318a and a negative component 318b. The line signal carries both a line TX signal and a line RX signal. For this reason, the positive component 318a of the line signal has a voltage $(k_1V_t+k_2V_r)$, where $k_1$ and $k_2$ are scale factors, $V_t$ is the voltage of the original TX signal, and $V_r$ is the voltage of the original RX signal. Either or both of $k_1$ and $k_2$ may be equal to any real or complex number or fraction thereof, including 1. Similarly, the negative component 318b of the line signal has a voltage $(-k_1V_t-k_2V_r)$.

One of skill in the art will recognize that line driver 302 may output additional signals to adaptive hybrid circuit 304 as needed to further tune transmission system 300. These additional signals may be output with or without fixed or variable impedances.

Hybrid 304 extracts an output RX signal from the line signal and outputs the RX signal along RX path 320 through a RX output port 326. In the example shown, the RX output signal has a positive component 320a and a negative component 320b.

Figure 4:
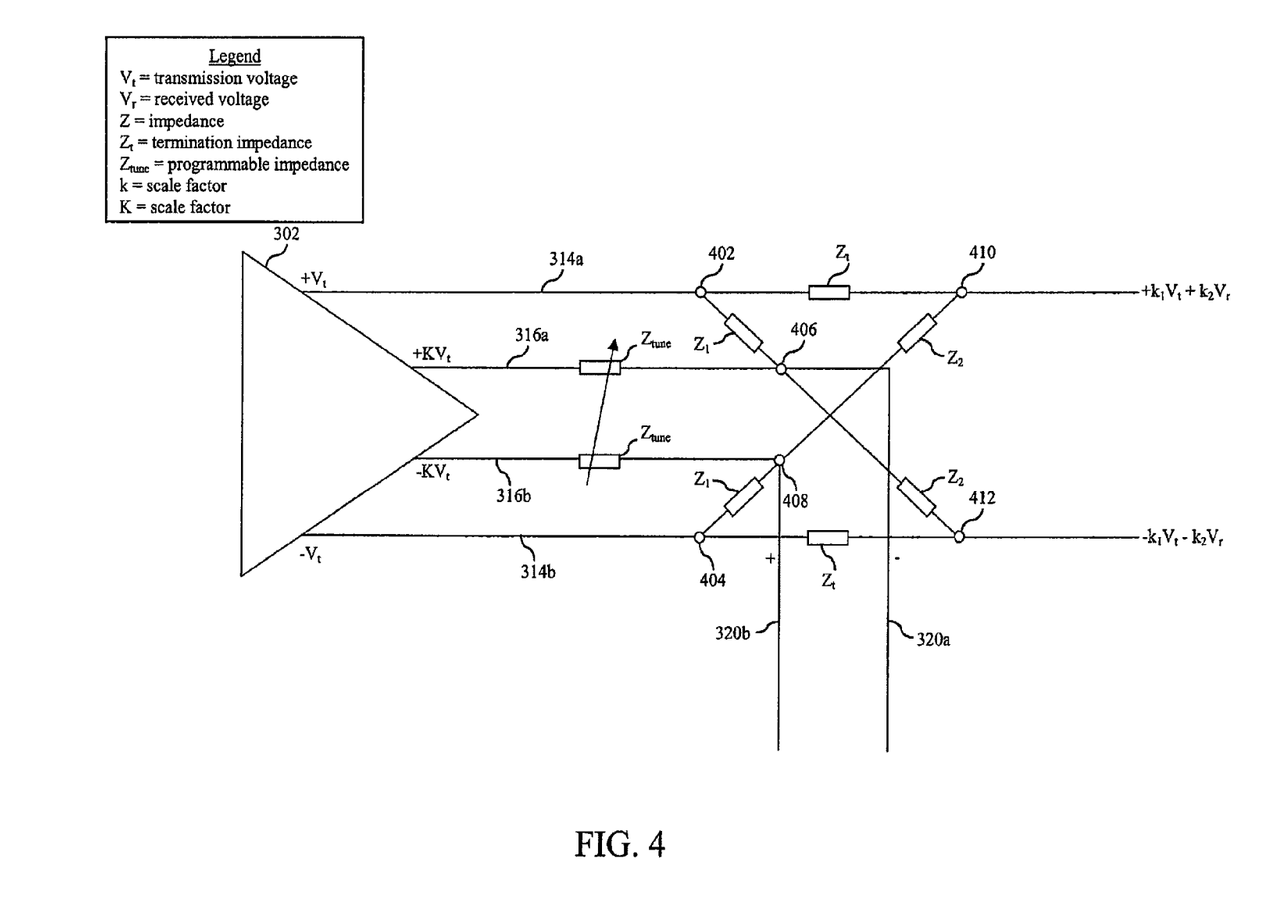
FIG. 4 is a block diagram of an adaptive hybrid circuit according to an embodiment of the present invention for use in the duplex transmission system of FIG. 3.

FIG. 4 is a more detailed diagram of hybrid 304 according to an embodiment of the present invention. Positive $TX_1$ signal component 314a is input into positive $TX_1$ input node 402. Negative $TX_1$ signal component 314b is input into negative $TX_1$ input node 404. Positive $TX_2$ signal component 316a is input into negative RX output node 406 through programmable impedance $Z_{tune}$. Negative $TX_2$ signal component 316b is input into positive RX output node 408 through programmable impedance $Z_{tune}$.

A fixed impedance $Z_1$ is located between positive $TX_1$ input node 402 and negative RX output node 406, as well as between negative $TX_1$ input node 404 and positive RX output node 408. A fixed impedance $Z_2$ is located between positive line input node 410 and positive RX output node 408, as well as between negative line input node 412 and negative RX output node 406.

Depending on the specific line in use, line impedance $Z_{line}$ will vary. If the transmission system does not account for these variations in $Z_{line}$ the TX echo signal in the RX output signal will degrade the quality of the RX output signal. This occurs because the $TX_1$ signal from the $TX_1$ inputs and the line TX signal from the line input do not completely cancel each other out when $Z_{line}$ changes. Embodiments of the present invention account for variations in $Z_{line}$ by adapting scale factor K and/or programmable impedance $Z_{tune}$. The resultant programmable $TX_2$ signal is then able to supplement the $TX_1$ signal in the hybrid, allowing better cancellation of the line TX signal. The programmable $TX_2$ signal also corrects for over-cancellation by the $TX_1$ signal in the hybrid. Better cancellation of the line TX signal results in a reduction of the TX echo in the output RX signal. Adaptive hybrid circuit 304 thus becomes a 4-port network, with one port specifically added to adaptively cancel the TX echo in the output RX signal.

Figure 5:
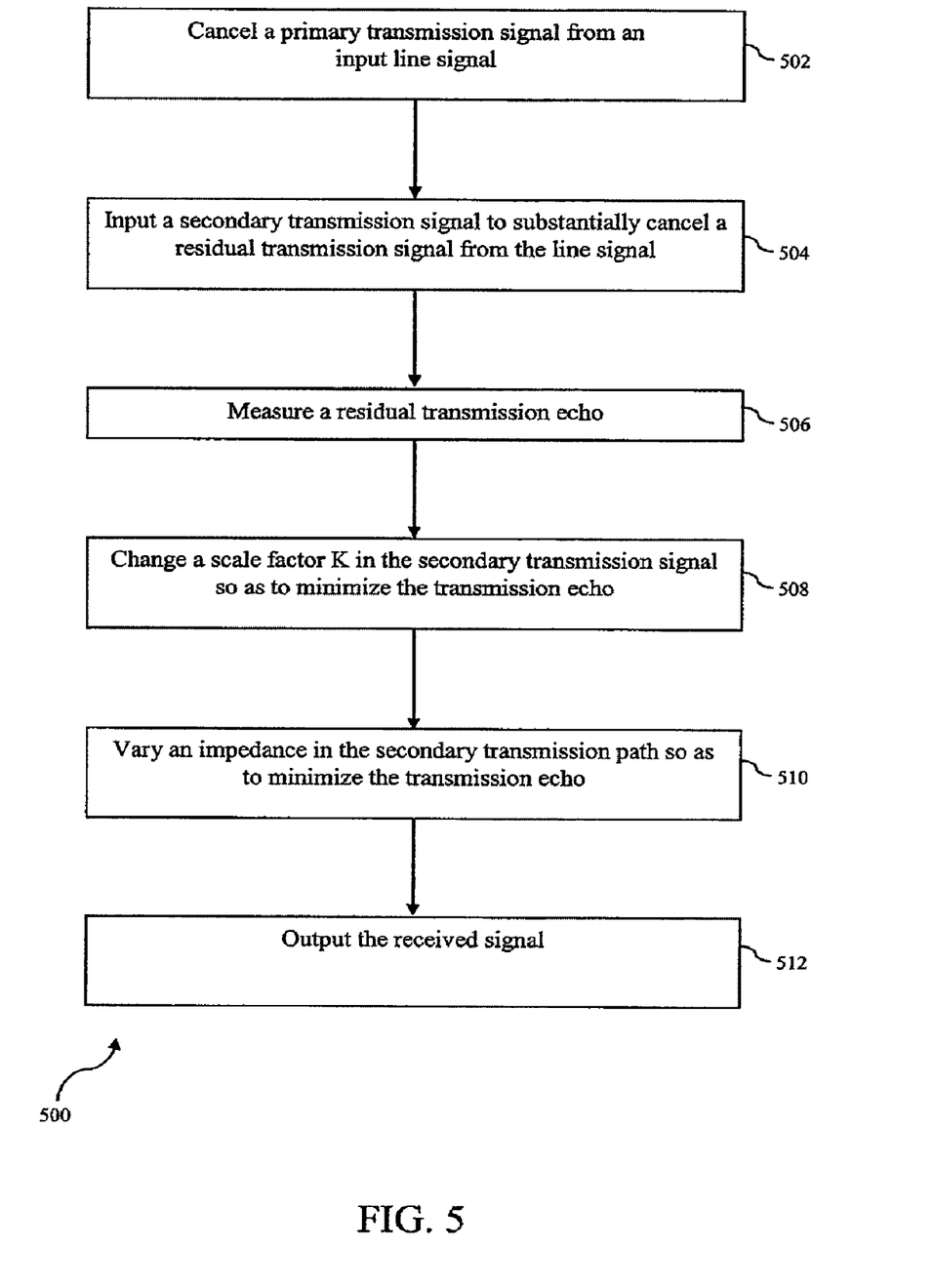
FIG. 5 is a flowchart of a method according to an embodiment of the present invention.

FIG. 5 is a flowchart of a method 500 according to an embodiment of the present invention. In step 502, a primary TX signal (such as $TX_1$) is cancelled from a line signal, where the line signal carries both a line TX signal and a line RX signal. Ideally, the primary TX signal input by the line driver and the line TX signal carried by the line signal cancel each other out, leaving only the line received signal. Due to varying line impedances, this cancellation may not always be sufficient to properly extract the RX output signal. A component of the line TX signal that remains after the primary TX signal is subtracted out is called the residual TX signal or the TX echo.

In step 504, a secondary TX signal (such as $TX_2$) is input into, for example, adaptive hybrid 304. The secondary TX signal supplements the primary TX signal to properly match and cancel the residual TX signal carried by the line signal. As mentioned above, the secondary TX signal may be scaled from the primary TX signal by a scale factor K.

In step 506, any remaining TX echo is measured. The TX echo may be the result of many different line conditions. For example, the TX echo may be evidence of a change in line impedance, since it results when the total line impedance is not appropriately matched with the termination impedance of the line driver.

In step 508, as further detailed below, the scale factor K is updated so as to better supplement the primary TX signal for improved cancellation of the line TX signal. This acts to minimize the TX echo. This is effective because a scale factor of the line TX signal (such as $k_1$) may have been altered by, among other things, a change in line impedance. Changing the scale of the secondary TX signal counteracts the scale changes in the line TX signal.

In step 510, an impedance in the secondary TX path, such as $Z_{tune}$ in $TX_2$ path 316, is changed to as to minimize the TX echo. In an embodiment, $Z_{tune}$ is changed to account for varying load impedances on the line.

K and $Z_{tune}$ may be varied independently or simultaneously. K and $Z_{tune}$ may be varied manually. Alternatively, K and $Z_{tune}$ may be programmed to automatically adapt to changing line conditions. One of skill in the art will recognize that both or only one of K and $Z_{tune}$ may be changed to adapt to a given line condition.

Steps 506-510 can be repeated as necessary to further minimize the TX signal.

Finally, after the TX echo is minimized, the RX output signal is output in step 512. Ideally, only the RX signal remains after cancellation of the line TX signal. One of skill in the art will recognize, however, that some amount of TX echo is still acceptable, because a reduction in TX echo is still an improvement over alternative methods.

An example of a useful method for determining K and $Z_{tune}$ to cancel out a given TX echo signal will now be described in more detail. For a multiple output line driver, 1:n transformer, and adaptive hybrid circuit of the present invention, the TX echo is given by:

$$V_{TX\_echo} = 2V_t * \begin{pmatrix} \frac{((Z_2 + Z_t/2)\|Z_{tune})}{((Z_2 + Z_t/2)\|Z_{tune}) + Z_1} - \\ \frac{k_1(Z_1\|Z_{tune})}{(Z_1\|Z_{tune}) + Z_2} + \\ \frac{K*(Z_1\|(Z_2 + Z_t/2))}{(Z_1\|(Z_2 + Z_t/2)) + Z_{tune}} \end{pmatrix}, \quad (4)$$

where $$k_1 = \frac{\frac{Z_{line}}{2n^2}\|((Z_1\|Z_{tune}) + Z_2)}{Z_t + \left(\frac{Z_{line}}{2n^2}\|((Z_1\|Z_{tune}) + Z_2)\right)}. \quad (5)$$

For $Z_{tune} \gg Z_1$ and $Z_2 \gg Z_t$, this expression reduces to:

$$V_{TX\_echo} = 2V_t * \left(\frac{(Z_2 - k_1 * Z_1)}{Z_1 + Z_2} + \frac{K*(Z_1\|Z_2)}{(Z_1\|Z_2) + Z_{tune}}\right), \quad (6)$$

where $$k_1 = \frac{\frac{Z_{line}}{2n^2}\|(Z_1 + Z_2)}{Z_t + \frac{Z_{line}}{2n^2}}. \quad (7)$$

In this embodiment, the variable $k_1$ varies according to $Z_{line}$, which is dependent on the specific line that line driver 302 may be deployed to drive. This means that $k_1$ is not under user control. In an embodiment, constants $Z_1$ and $Z_2$ are fixed at a value that gives the lowest TX echo for a typical line condition. This is based on a nominal value for $Z_{line}$. Because of this, only K and $Z_{tune}$ may be altered.

With the last term in equation (6), the TX echo can be driven closer to zero at the RX output of the hybrid by adaptively varying K and $Z_{tune}$. In this circuit, the expected variation of $Z_{line}$ over all possible line conditions would be examined. Nominal values for $Z_1$ and $Z_2$, and the range of values for $Z_{tune}$ and K, would be chosen to allow for the hybrid to cancel the TX echo over all the line cases.

Figure 6:
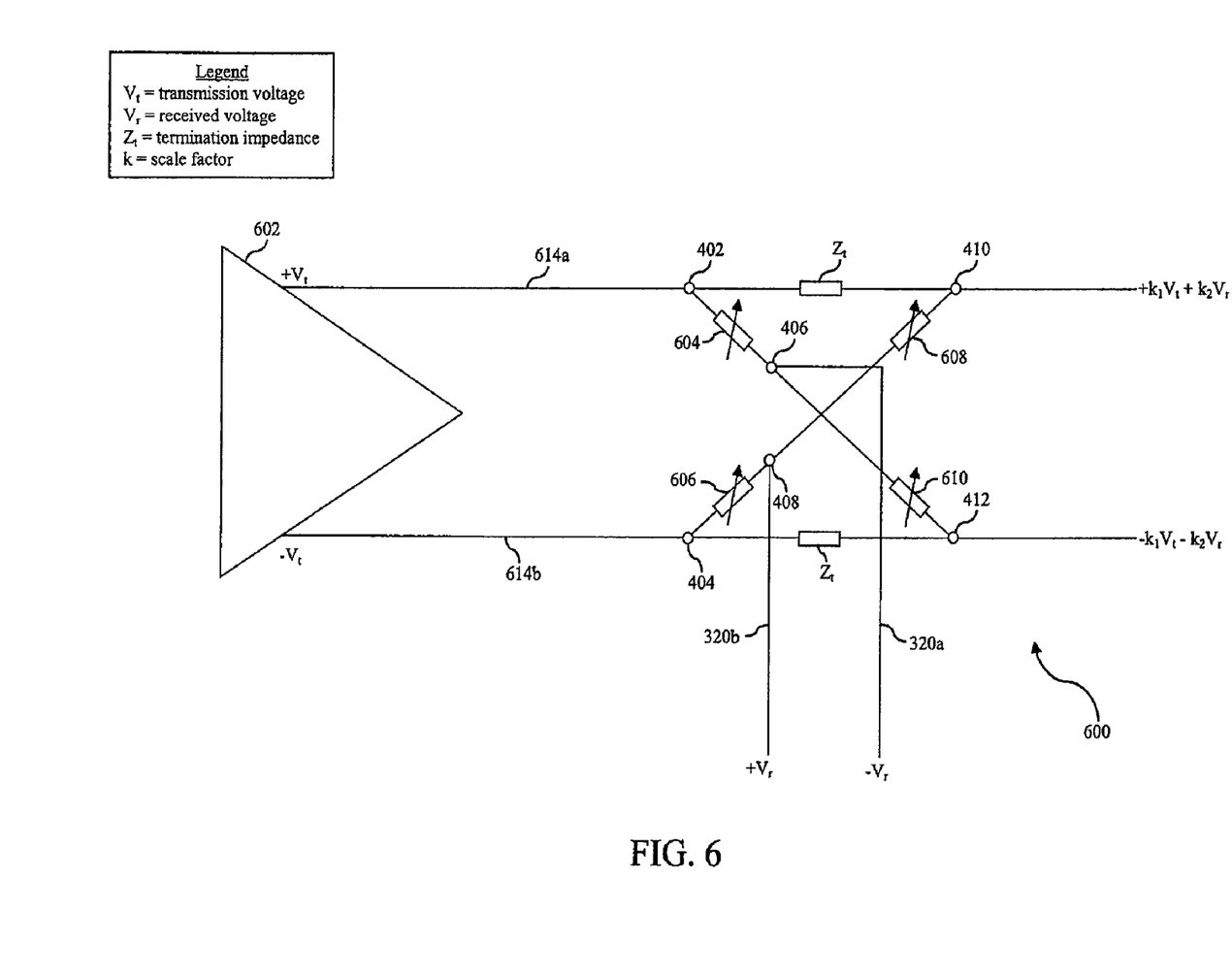
FIG. 6 is a block diagram of another adaptive hybrid circuit according to an embodiment of the present invention.

The embodiment described with respect to FIGS. 4 and 5 uses a programmable impedance $Z_{tune}$ in conjunction with fixed impedances $Z_1$ and $Z_2$. Alternatively, an embodiment substituting programmable impedances for fixed impedances $Z_1$ and $Z_2$ and removing the $TX_2$ signal may be used. FIG. 6 is a diagram of a 3-port hybrid 600 according to such an embodiment. Positive TX signal component 614a is input into positive TX input node 402. Negative TX signal component 614b is input into negative TX input node 404. Impedances $Z_1$, in FIG. 4 have been replaced with programmable impedances 604 and 606, which may be substantially equal. Impedances $Z_2$ in FIG. 4 have been replaced with programmable impedances 608 and 610, which may be substantially equal.

Positive TX input node 402 is coupled to negative RX output node 406 through programmable impedance 604. Negative TX input node 404 is coupled to positive RX output node 408 through programmable impedance 606. Positive line input node 410 is coupled to positive RX output node 408 through programmable impedance 608, and negative line input node 412 is coupled to negative RX output node 406 through programmable impedance 610. Variations in $Z_{line}$ can thus be accounted for by adapting programmable impedances 604, 606, 608 and 610. In this embodiment, adaptive hybrid circuit 600 is a 3-port circuit, and does not use an additional TX input (such as $TX_2$ in FIG. 4) to separate the RX output from the line signal.

Figure 7:
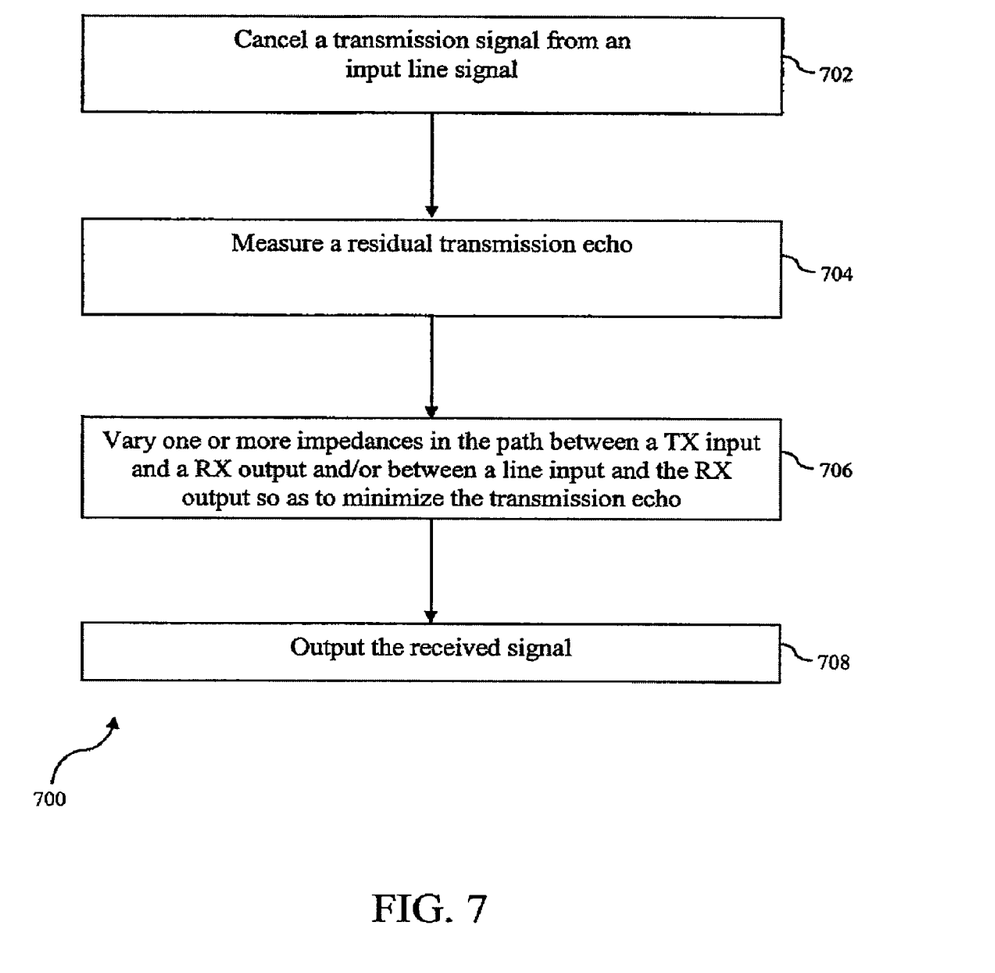
FIG. 7 is a flowchart of a method according to an embodiment of the present invention.

FIG. 7 is a flowchart of a method 700 according to an embodiment of the present invention. In step 702, an initial TX signal, such as TX signal 614a and 614b, is cancelled from a line signal, wherein the line signal carries both a line TX signal and a line RX signal. This results in an RX output signal In step 704, residual TX echo is measured in the RX output signal.

In step 706, one or more impedances in the path between the TX input and the RX output and/or between the line input and the RX output is updated so as to better cancel the TX signal from the line signal. This updating may occur manually or automatically. This impedance change counteracts changes in load impedance on the line.

Steps 704-706 may be repeated as necessary to further minimize the TX echo.

In step 708, after the TX echo has been minimized, the RX output signal is produced.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A circuit, comprising:
   an adaptive hybrid circuit, comprising:
      a transmission input port, comprising
         a positive transmission input node coupled to a first programmable impedance, and
         a negative transmission input node coupled to a second programmable impedance;
      a line port, comprising
         a positive line node coupled to a third programmable impedance, and
         a negative line node coupled to a fourth programmable impedance; and
      a receive output port, comprising:
         a positive receive output node coupled to the negative transmission input node through the second programmable impedance and coupled to the positive line node through the third programmable impedance, and
         a negative receive output node coupled to the positive transmission input node through the first programmable impedance and to the negative line node through the fourth programmable impedance.

2. The circuit of claim 1, further comprising a line driver coupled to the transmission input port.

3. The circuit of claim 1, further comprising a transformer coupled to the line port.

4. The circuit of claim 3, further comprising a communications device coupled to the transformer.

5. The circuit of claim 1, wherein the impedances are configured to adapt to changing line impedance without user intervention.

6. The circuit of claim 1, wherein the adaptive hybrid circuit is configured to measure a residual transmit echo.

7. The circuit of claim 6, wherein the adaptive hybrid circuit is further configured to adapt at least one of the first, second, third, and fourth programmable impedances to reduce the residual transmit echo.

8. The system of claim 1, wherein the first programmable impedance and the second programmable impedance are substantially equal.

9. The system of claim 1, wherein the third programmable impedance and the fourth programmable impedance are substantially equal.

10. The system of claim 1, wherein:
the negative transmission input node is coupled to the negative line node through a first termination impedance; and
the positive transmission input node is coupled to the positive line node through a second termination impedance.

11. A method for extracting a received signal from a line signal, comprising:
substantially canceling a transmission signal from the line signal to produce a received signal;
measuring a residual transmission echo in the received signal;
varying at least one impedance in a path between a transmit input and a receive output so as to reduce the transmission echo; and
outputting the received signal.

12. The method of claim 11, wherein the substantially canceling comprises:
receiving the transmission signal; and
subtracting the transmission signal from the line signal.

13. The method of claim 11, further comprising repeating the measuring step and the varying step.

14. The method of claim 11, further comprising:
varying at least one impedance in a path between a line input and the receive output so as to further reduce the transmission echo.

15. The method of claim 14, wherein:
varying the at least one impedance in the path between the transmit input and the receive output comprises varying the at least one impedance in the path between the transmit input and the receive output based on a change in a line load impedance; and
varying the at least one impedance in the path between the line input and the receive output comprises varying the at least one impedance in the path between the line input and the receive output based on the change in the line load impedance.

16. The method of claim 14, wherein:
varying the at least one impedance in the path between the transmit input and the receive output comprises:
varying an impedance in a path between a positive transmission input node and a negative receive output node; and
varying an impedance in a path between a negative transmission input node and a positive receive output node; and
varying the at least one impedance in the path between the line input and the receive output comprises:
varying an impedance in a path between a positive line node and the positive receive output node; and
varying an impedance in a path between a negative line node and the negative receive output node.

17. The method of claim 14, wherein varying the at least one impedance in the path between the transmit input and the receive output and varying the at least one impedance in the path between the line input and the receive output occur automatically without user intervention.

18. The method of claim 11, wherein varying comprises varying the at least one impedance in the path between the transmit input and the receive output based on a change in a line load impedance.

19. The method of claim 11, wherein the varying is performed automatically without user intervention.

20. The method of claim 11, wherein the varying comprises:
varying an impedance in a path between a positive transmission input node and a negative receive output node; and
varying an impedance in a path between a negative transmission input node and a positive receive output node.

* * * * *